(12) United States Patent
Xu et al.

(10) Patent No.: US 8,970,562 B2
(45) Date of Patent: Mar. 3, 2015

(54) LCD MODULE WITH THERMAL SENSOR INTEGRATED AND ITS IMPLEMENTATION

(75) Inventors: Gang Xu, Cupertino, CA (US); Aaron M. Leiba, Palo Alto, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1914 days.

(21) Appl. No.: 11/069,393

(22) Filed: Mar. 1, 2005

(65) Prior Publication Data

US 2006/0197740 A1 Sep. 7, 2006

(51) Int. Cl.
 G06F 1/20 (2006.01)
 G09G 3/36 (2006.01)

(52) U.S. Cl.
 CPC .............. *G06F 1/206* (2013.01); *G09G 3/3611* (2013.01); *G09G 2320/041* (2013.01); *Y02B 60/1275* (2013.01)
 USPC .......................................... 345/204; 345/101

(58) Field of Classification Search
 USPC .................................................. 345/101, 204
 See application file for complete search history.

(56) References Cited

U.S. PATENT DOCUMENTS

| | | | | |
|---|---|---|---|---|
| 4,356,427 A * | 10/1982 | Noguchi et al. | ............... | 313/422 |
| 5,897,663 A * | 4/1999 | Stancil | ........................... | 711/200 |
| 5,900,851 A * | 5/1999 | Toffolo et al. | ................... | 345/76 |
| 5,936,354 A * | 8/1999 | Smith et al. | ................. | 315/169.3 |
| 6,177,926 B1 * | 1/2001 | Kunert | ........................... | 345/173 |
| 6,268,857 B1 * | 7/2001 | Fishkin et al. | ................ | 715/863 |
| 6,288,896 B1 * | 9/2001 | Hsu | ........................... | 361/679.54 |
| 6,437,543 B1 * | 8/2002 | Oler et al. | ..................... | 320/150 |
| 6,510,052 B2 * | 1/2003 | Ishikawa et al. | ......... | 361/679.47 |
| 6,728,102 B2 * | 4/2004 | Ishikawa et al. | ......... | 361/679.48 |
| 6,751,095 B2 * | 6/2004 | Ishikawa et al. | ......... | 361/679.21 |
| 6,813,150 B2 * | 11/2004 | King et al. | ............... | 361/679.48 |
| 6,873,883 B2 * | 3/2005 | Ziarnik | ......................... | 700/300 |
| 6,906,919 B2 * | 6/2005 | Pokharna et al. | ........ | 361/679.21 |
| 7,017,059 B2 * | 3/2006 | Law et al. | ...................... | 713/322 |
| 7,042,434 B2 * | 5/2006 | Woo | ............................... | 345/101 |
| 7,082,578 B1 * | 7/2006 | Fishkin et al. | ................ | 715/863 |
| 7,120,808 B2 * | 10/2006 | Miyairi et al. | ................ | 713/322 |
| 7,145,560 B2 * | 12/2006 | Woo | ............................... | 345/211 |
| 7,219,247 B2 * | 5/2007 | Law et al. | ...................... | 713/322 |
| 7,321,490 B2 * | 1/2008 | Wu | ........................... | 361/679.48 |
| 7,420,538 B2 * | 9/2008 | Murao et al. | .................. | 345/101 |
| 7,532,196 B2 * | 5/2009 | Hinckley | ....................... | 345/156 |
| 2003/0023887 A1 * | 1/2003 | Maciorowski et al. | ....... | 713/300 |
| 2003/0043106 A1 * | 3/2003 | Woo | ............................... | 345/101 |
| 2003/0085870 A1 * | 5/2003 | Hinckley | ....................... | 345/156 |
| 2003/0132929 A1 * | 7/2003 | Woo | ............................... | 345/211 |
| 2003/0184967 A1 * | 10/2003 | Holalkere et al. | ............ | 361/687 |

(Continued)

*Primary Examiner* — Kumar Patel
*Assistant Examiner* — Afroza Chowdhury
(74) *Attorney, Agent, or Firm* — Fletcher Yoder PC

(57) ABSTRACT

A temperature sensing apparatus (10) and associated method (60) wherein a temperature sensor (22) or a plurality of temperature sensors (22) is placed in or in proximity to a liquid crystal display module (12) of a computer system (11, 11a, 11b). The temperature sensor(s) (22) are placed on, or in near proximity to the liquid crystal display module (12) at positions determined according to the requirements of a particular application. Temperature of the liquid crystal display module (12) is communicated digitally to an associated computer (14) by, for example, a bus such as an inter-integrated circuit interface bus (26). When the temperature exceeds a predetermined limit, remedial action, such as increasing fan speed, reducing speed and or power consumption of other components, or the like, is taken to reduce the temperature.

7 Claims, 2 Drawing Sheets

(56) References Cited

U.S. PATENT DOCUMENTS

| | | |
|---|---|---|
| 2003/0227443 A1* | 12/2003 | Kyouzuka et al. ............ 345/156 |
| 2003/0231157 A1* | 12/2003 | Sugino et al. ................ 345/101 |
| 2004/0027799 A1* | 2/2004 | King et al. .................... 361/687 |
| 2004/0133816 A1* | 7/2004 | Miyairi et al. ................ 713/300 |
| 2004/0186929 A1* | 9/2004 | Salerno .......................... 710/16 |
| 2004/0223299 A1* | 11/2004 | Ghosh .......................... 361/687 |
| 2005/0038982 A1* | 2/2005 | Park et al. ........................ 713/1 |
| 2005/0104526 A1* | 5/2005 | Rossi et al. .................... 315/149 |
| 2005/0122305 A1* | 6/2005 | Murao et al. .................. 345/101 |
| 2005/0156838 A1* | 7/2005 | Miyagawa et al. ............. 345/77 |
| 2006/0149881 A1* | 7/2006 | Clayton et al. ................ 710/302 |

\* cited by examiner

LCD MODULE WITH THERMAL SENSOR INTEGRATED AND ITS IMPLEMENTATION

BACKGROUND OF THE INVENTION

1. Field of the Invention

The present invention relates generally to the field of personal computers and component parts thereof, and more particularly to an apparatus and method for monitoring and controlling the temperature of monitor devices, particularly liquid crystal display modules ("LCMs") used in conjunction with certain personal computers. The predominant current usage of the inventive temperature sensing apparatus and method is in preventing problems related with overheating in portable computers, particularly but not exclusively in tablet type computer devices, wherein heat is a particular problem because certain heat producing components may be directly behind the LCM.

2. Description of the Background Art

Thermal management in computer systems, especially in laptops, is a very challenging issue. Many components, primarily the Central Processing Unit ("CPU"), the Graphics Processing Unit ("GPU"), the hard drive, the optical drive, and the LCM, generate heat during operation and contribute to a total thermal loading of the system. These same components are also very sensitive to high temperatures. The temperature on an LCM and/or a temperature gradient, can affect the display optical performance, including causing undesirable artifacts and non-uniformity in displayed images. The problem might look more severe when viewed in the mid gray levels and over wide viewing angles.

Of course, the designers of the LCMs do what they can to reduce the amount of destructive heat produced by the LCM. However, despite the fact that it has been known in the prior art that excessive heating of the LCM may cause problems, to the inventors' knowledge, there has not been a significant effort to try to control or otherwise insure that the temperature of the LCM, or portions thereof, do not exceed optimal temperature ranges while the LCM is in operation.

Prior to the present invention, it was thought that either the problems associated with heat in the LCM were not significant enough to address separately, or else the expense in additional parts, and the like, would make an effort to control the temperature of the LCM less than cost effective.

It is known in the art to incorporate temperature sensors in CPUs, graphics processor units ("GPUs"). hard drives, and battery packs. However, to the inventors' knowledge, for reasons including those discussed above, no such device has been included in, on, or in close proximity to an LCM module, or the like.

SUMMARY

An example of an embodiment of the invention is a computer video display temperature control system having at least one temperature sensor positioned on or near the LCM display device, such as on the printed circuit board of the LCM. The temperature sensor(s) communicate to the CPU of the computer system through an Inter-Integrated Circuit interface ("I$^2$C"), which is already connected to the LCM. The I$^2$C is one of the several busses in the computer system. One use of the I$^2$C is to communicate extended display identification data ("EDID") data from the LCM to the computer. The EDID is stored in an EDID EEPROM on the printed circuit board of the LCM.

Since the I$^2$C already connects the LCM to the computer, temperature data can be communicated from the temperature sensor(s) to the computer without requiring additional hardware communication means or wiring between the units. When the CPU of the computer receives the temperature information from the LCM it can take remedial action to lower the temperature, as is deemed necessary or desirable. The remedial action can include, but is not limited to increasing the speed of a fan in the enclosure to remove the heat from the computer or, in some manner, throttling the system in an attempt to reduce the total heat generated within the computer. A key aspect to the above thermal control mechanism is the ability to accurately measure the temperature of the critical components in the LCM. This accuracy is accomplished by incorporating a temperature-sensing device within, or next to, any such critical component(s).

In various embodiments of the invention, the invention is employed in various types of computers, including but not limited to a laptop computer and a tablet type computer. In the later of these, the invention is particularly important, due to the proximity of the LCM to other heat producing elements in the tablet type computer.

Accordingly, it is an object of the present invention to provide an apparatus and method for preventing excessive heat buildup in the LCM of a computer.

It is another object of the present invention to provide an apparatus and method which is an easy and inexpensive addition to existing computer system designs.

It is still another object of the present invention to prevent premature failure of a computer display device caused by excessive heat.

It is yet another object of the present invention to prevent undesirable operational conditions and effects caused by heat in a computer display device.

It is still another object of the present invention to provide an apparatus and method for determining when and if remedial action is required to correct the temperature of an LCM display device while in operation It is yet another object of the present invention to provide an apparatus and method for controlling the temperature of a computer so as to prevent the temperature of an associated LCM module from exceeding predetermined temperature conditions.

These and other objects and advantages of the present invention will become clear to those skilled in the art in view of the description of modes of carrying out the invention, and the industrial applicability thereof, as described herein and as illustrated in the several figures of the drawing. The objects and advantages listed or discussed herein are not an exhaustive list of all possible objects or advantages of the invention. Moreover, it will be possible to practice the invention even where one or more of the intended objects and/or advantages might be absent or not required in the application.

Further, those skilled in the art will recognize that various embodiments of the present invention may achieve one or more, but not necessarily all, of the above described objects and/or advantages. Accordingly, the listed objects and advantages are not essential elements of the present invention, and should not be construed as limitations.

DETAILED DESCRIPTION

Figure 1:
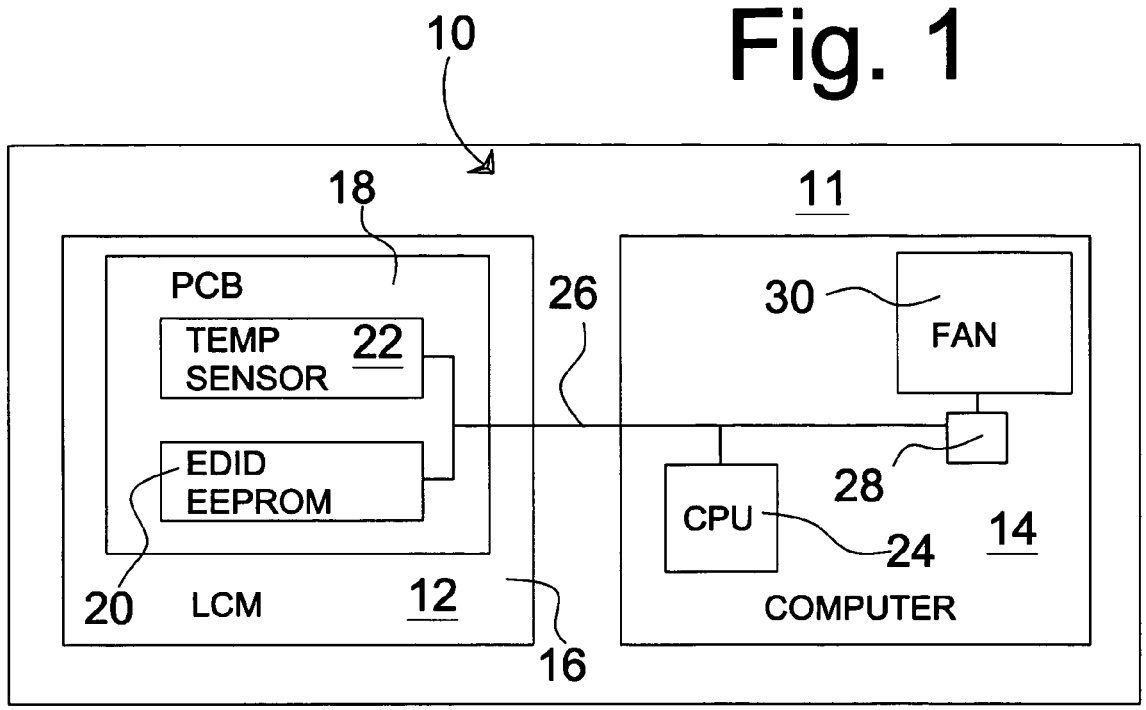
FIG. 1 is a block diagrammatic view of a computer system showing the principle components for practicing the present invention.

This invention is described in the following description with reference to the Figures, in which like numbers represent the same or similar elements. While this invention is described in terms of modes for achieving this invention's objectives, it will be appreciated by those skilled in the art that variations may be accomplished in view of these teachings without deviating from the spirit or scope of the present invention. The embodiments and variations of the invention described herein, and/or shown in the drawings, are presented by way of example only and are not limiting as to the scope of the invention. Unless otherwise specifically stated, individual aspects and components of the invention may be omitted or modified, or may have substituted therefore known equivalents, or as yet unknown substitutes such as may be developed in the future or such as may be found to be acceptable substitutes in the future. The invention may also be modified for a variety of applications while remaining within the spirit and scope of the claimed invention, since the range of potential applications is great, and since it is intended that the present invention be adaptable to many such variations.

A known mode for carrying out the invention is a temperature sensing apparatus 10 configured as part of a computer system 11. The computer system 11 has a LCM 12 and a computer 14, where the computer 14 is here defined as being, generally, those portions of the computer system 11 exclusive of the video display LCM 12 and its housing, if the LCM 12 is housed separately. As will be described by example in greater detail hereinafter, in a laptop type computer the computer 14 will generally have a keyboard, a pointing device (such as a touch pad, or the like), a hard disk drive, a circuit board having thereon a plurality of components, and other components familiar to those skilled in the art, while the LCM 12 will be in distinctly separate but generally attached enclosure. In a tablet type computer, the LCM 12 and the computer 14 might be housed in the same enclosure.

The LCM 12 has a glass portion 16 (including a backlight portion not shown separately in FIG. 1) and a PCB 18 attached thereto. The PCB 18 will have thereon integrated circuits and other components for driving the LCM to produce an image thereon. Additionally, the PCB 18 generally will have thereon an EDID EEPROM 20. The EDID EEPROM 20 is a component for identifying the particular type of LCM 12 to the computer 14. One skilled in the art will recognize that the information provided by the EDID EEPROM 20 allows the computer 14 to adjust several factors, including image color shift to conform to the color response of the particular LCM 12 type. Also, the computer 14 will know, from the information provided by the EDID EEPROM 20 and information provided by software, the size, native resolution, and other characteristics of the LCM 12.

According to the present invention at least one temperature sensor 22 is provided in close proximity to the LCM 12. In this example, the temperature sensor 22 is located on the PCB 18 of the LCM 12. It will be a relatively simple task for designers in each application of the invention to determine which areas of the LCM 12 might be susceptible to over heating and, therefore, which areas should have a temperature sensor 22 placed on or adjacent thereto. Potential locations for the temperature sensor(s) 22 can be determined by considering the thermal profile of the LCM 12, and also by giving consideration to which positions on the LCM 12 might be most susceptible to performance degradation when subject to excessively high temperatures.

A variety of cost-effective digital temperature sensors that can accurately measure temperature within a few degrees are available. The National Semiconductor™ LM75 is an example of such a device that is being used in the embodiment shown. The LM75 temperature sensor 22 is capable of measuring temperature at a single location. If it is determined that more than one location on the LCM 12 should be monitored, then there are alternative solutions. Either multiple LM75 devices can be used, or a single device with multiple sensors (such as the National Semiconductor™ LM89) can be used.

In either case, information from the temperature sensor 22 is communicated to a CPU 24 via an $I^2C$ bus 26. The $I^2C$ bus 26 is a bus already in place in the computer system 11. The EDID EEPROM 20, discussed previously herein, also communicates with the CPU 24 via the $I^2C$ bus 26. When it is determined that the temperature reported by the temperature sensor 22 exceeds a predetermined limit, then the CPU 24 will communicate with a control module 28 to control (increase, in this instance) the speed of a fan 30. In some embodiments of the invention, the control module 28 may be integral with the fan 30. One skilled in the art will recognize that the CPU 24 can communicate individually with the EDID EEPROM 20, the temperature sensor 22 the control module 28, and any other components connected to the $I^2C$ bus 26, because each of these has its own logical address. In an alternate embodiment, temperature sensor 22 is integrated into one of the other chips (e.g., EDID EEPROM 20) already present in the design of LCM 12, preferably a chip that already has an existing means of communication (e.g., $I^2C$ bus 26) with CPU 24.

The control module 28 is also representative of other devices which might be controlled by the CPU 24 in response to indications from the temperature sensor 22. For example, the control module 28, or some such equivalent device, might be used to temporarily turn off unused heat producing components, or essentially any other type of remedial action that might reduce the heat produced in the computer system 11. According to the presently described embodiment of the temperature sensing apparatus 10, the CPU 24 also modifies its own operating speed in order to reduce the amount of power used and, thereby the amount of heat created. Alternative methods for reducing the amount of heat produced in the computer system 11 are controlling the speed of the GPU, the system memory, or the like. It should be noted that, in laptop computers and the like, wherein the LCM 12 is housed separately from the computer 14, changes in the temperature within the computer 14 will only indirectly effect the temperature of the LCM 12, however there will be some effect and the remedial methods discussed above are, in fact, applicable even in such applications. For example, notebook style computers can typically operate in a "lid closed" mode where the machine is still operating, but with the lid closed. In such cases, the LCD housing 40 will be in direct and/or close contact with the computer housing 42, so remedial action that reduces power in the base of the unit will also reduce the temperature of the LCD. A more direct type of remedial action that can be taken regarding the LCM 12 is to modify the power usage of the LCM 12 as, for example, by controlling the brightness of the LCM 12 itself. It should be noted that when, after any remedial method is taken and after the temperature sensed by the temperature sensor 22 falls below a predetermined acceptable value, then the CPU 24 will generally cause such remedial action to be terminated unless and until such temperature again rises to an unacceptable level.

Figure 2:
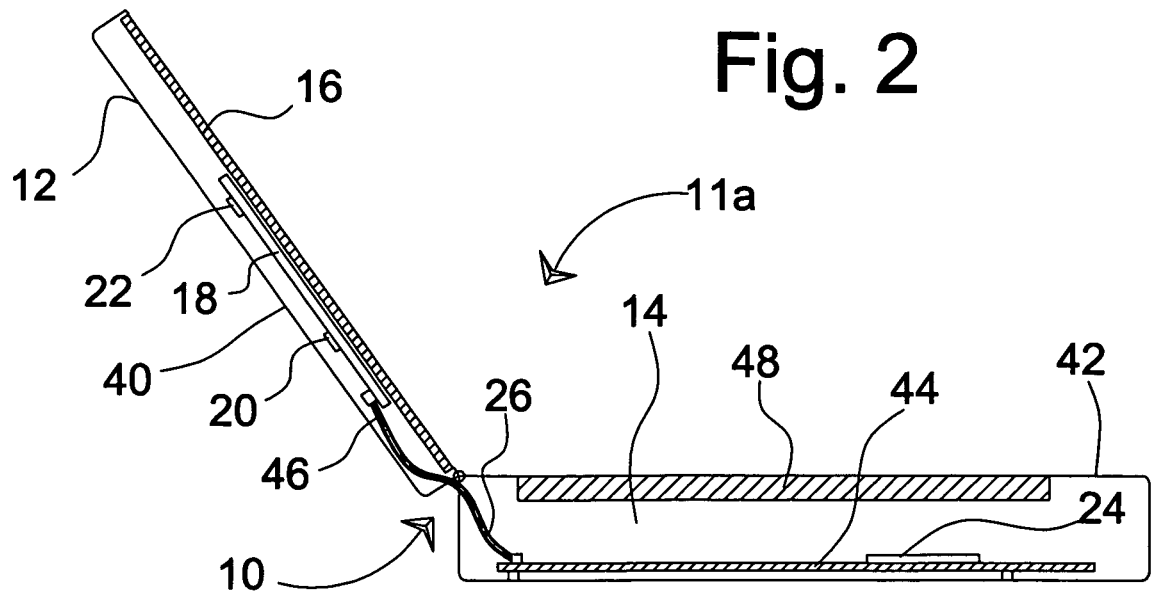
FIG. 2 is side cross-sectional view of an example of a laptop type computer application of the present invention.

FIG. 2 is a cross-sectional side elevational view of a laptop type computer system 11a embodying an example of the inventive temperature sensing apparatus 10. As can be seen in the view of FIG. 2, the LCM 12 is housed in a generally separate LCM housing 40, while the computer 14 is housed in its own computer housing 42.

In applications such as that depicted in the example of FIG. 2, the LCM 12 is electrically connected to a main circuit board 44, and thereby to the CPU 24 via a connecting cable 46 which, in this example, is a ribbon type cable. Accordingly, the I$^2$C 26 is included as a conductor set within the connecting cable 46. The computer system 11a can, optionally, be programmed such that, when the temperature sensor 22 senses an excessive temperature, the CPU 24 can cause any of the possible remedial operations discussed above to be initiated.

As can be seen in the view of FIG. 2, in this example the temperature sensor 22 is located on the PCB 18 of the LCM 12. As previously discussed herein, the placement of the temperature sensor 22 in the view of FIG. 2 is an example only. Designers employing the inventive temperature sensing apparatus 10 will determine the correct position for the temperature sensor 22, or for multiple iterations of the temperature sensor 22, by methods such as measuring the temperatures on various portions of the LCM 12 and/or by determining which portions of the LCM 12 most need to be protected from heat based upon considerations such as which portions are most adversely affected by excessive heat.

It should be noted that the simple example of FIG. 2 omits, for the sake of clarity, many components that must or can be included in the computer system 11a. A keyboard 48 is depicted in block diagrammatic form. However, other components, including heat producing components such as a hard drive, a GPU, memory, a CD ROM drive, and the like, are not specifically depicted in this drawing.

Figure 3:
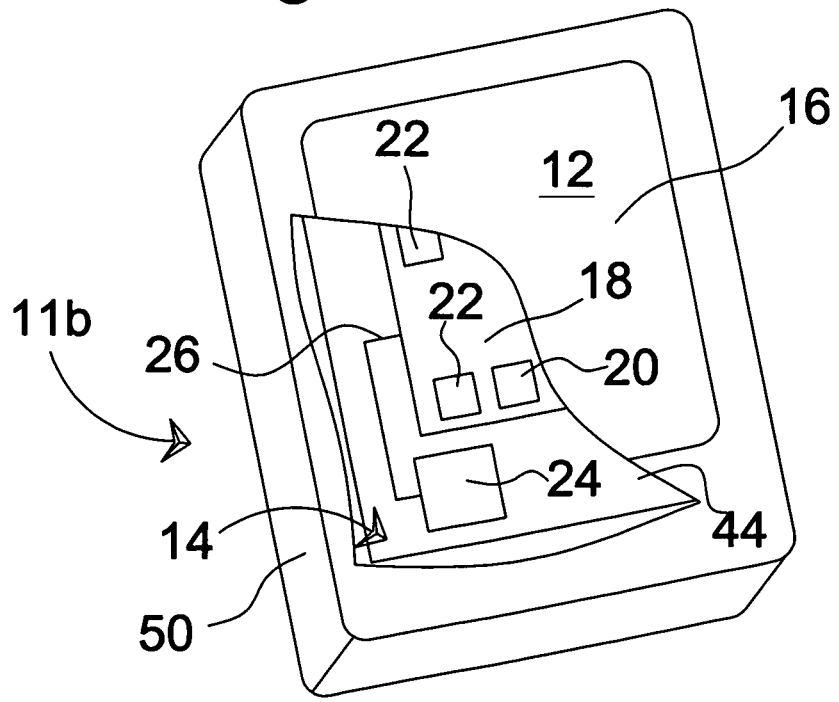
FIG. 3 is a partially cut away perspective view of an example of a tablet type computer application of the present invention.

FIG. 3 is a partially cut away perspective view of a simple example of a tablet type computer system 11b. In the tablet type computer system 11b, the LCM 12 and the computer 14 are housed generally in a single integrated housing 50. As can be seen through the cutaway portion of the drawing, there are two of the temperature sensors 22 visible in this view. In this example, the temperature sensors 22 are each single sensor types and are each individually connected to the I$^2$C 26 (connections not visible in the view of FIG. 3). As discussed previously herein, a multiple sensor type temperature sensor unit could also be used for the application. Also, it should be noted that the quantity of temperature sensors 22 is not limited to two. As many temperature sensors 22 could be employed as the designers of a particular application might find to be useful. As previously discussed in relation to FIG. 3, the example of FIG. 4 is a very simple example and many components of the computer system 11b that are not necessary for the explanation of the present invention are omitted for the sake of clarity.

Figure 4:
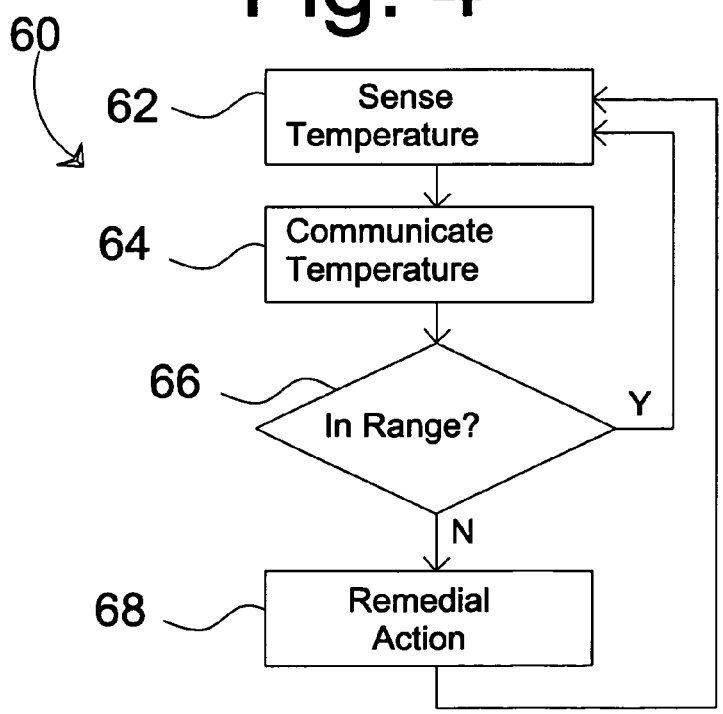
FIG. 4 is a flow diagram depicting the basic operations of the present inventive method.

FIG. 4 is a basic flow diagram depicting the high level operations of a temperature control method 60. According to the temperature control method 60 the temperature of all or portions of the LCM 12 are detected and digitized by one or more of the temperature sensors 22 in a "sense temperature" operation 62. In a "communicate temperature" operation 64, the sensed temperature is communicated to the CPU 24 of the associated computer 14. As discussed previously herein, in the examples provided, such communication is accomplished via the I$^2$C bus 26, which is provided also for other purposes in the computer systems 11, 11a and 11b.

In an "in range" decision operation 66, it is decided (by the CPU 24 according to programmed parameters) if the reported temperature(s) are within a predetermined range. If the result of the "in range" decision operation 66 is that the temperature is out of range, then remedial action is taken in a "remedial action" operation 68. If the reported temperature is outside the predetermined range on the high side, then the remedial action will consist of one or more actions intended to reduce the temperature, such as increasing fan speed, and/or actions to reduce power consumption and, therefore, heat dissipated by components in the computer 14, such as reducing operating speed and/or power applied to the computer 14, a GPU, hard drive(s), CD ROM drives, the LCM 12 itself, and the like. One skilled in the art will recognize that this is not an exhaustive list of possible operations that might be performed to reduce and/or regulate the heat production and/or dissipation of the computer systems 11, 11a and 11b.

A significant aspect to the temperature control method 60 is the ability to accurately measure the temperature of the critical components. This accuracy is accomplished by incorporating the temperature sensor(s) 22 within, or next to, the critical components or positions of the LCM 12. According to the present inventive temperature control method 60, when the temperature sensing apparatus 10 described herein, or equivalent, is used, then the connectors between the LCM 12 and the computer 14 need not be changed, and the pin counts, and the like, will be unaltered. Therefore, the present inventive apparatus and method can be implemented at minimal cost.

Various modifications may be made to the invention without altering its value or scope. For example, the sizes, shapes and quantities of components shown and described in relation to the examples discussed herein could each or all be varied according the needs or convenience of a particular application.

Another possible variation of the present invention would be to used different sensors or types of sensors than those specifically disclosed herein. It should also be noted that the example of the I$^2$C 26 bus used herein is not the only communications means that might be employed. The invention could be practiced using other communications means, including but not limited to another bus that might already be existing in the computer systems 11, 11a and 11b. As has been discussed previously, the examples presented herein are not intended to be an exhaustive list of all remedial operations that might be used to modify the temperature of the computer systems 11, 11a and 1b, or equivalents thereof, and a display apparatus, including but not limited to the LCM 12 associated therewith.

All of the above are only some of the examples of available embodiments of the present invention. Those skilled in the art will readily observe that numerous other modifications and alterations may be made without departing from the spirit and scope of the invention. Accordingly, the disclosure herein is not intended as limiting and the appended claims are to be interpreted as encompassing the entire scope of the invention.

The inventive temperature sensing apparatus 10 and temperature control method 60 are intended to be widely used in essentially any type of computer wherein it is desirable to monitor and/or control the temperature of or near display components thereof. The particular examples presented herein represent applications that are presently contemplated by the inventors, but these examples are not intended to be an exhaustive list of all possible applications. Since, the temperature sensing apparatus 10 does not require additional components or conductors to communicate temperatures from the temperature sensor 22 to the computer 14, it is expected that the present inventive apparatus and method will be widely adapted for use in the industry.

We claim:

1. A computer, comprising:
a display module disposed within a display housing;
a central processing unit operably connected to the display module through a data bus and disposed within a computer housing separate from the display housing;
a temperature sensor positioned in the display module and configured to detect a temperature of at least a portion of the display module; and
an electronic control device communicatively coupled to the temperature sensor through the data bus and operably coupled to the display module, wherein the electronic control device is configured to adjust a brightness of the display module responsive to the detected temperature to reduce heat within the display module when the detected temperature exceeds a predetermined value;
wherein the electronic control device is configured to reduce heat within the display module by disabling one or more heat producing components within the display module.

2. A computer, comprising:
a display module disposed within a display housing;
a central processing unit operably connected to the display module through a data bus and disposed within a computer housing separate from the display housing;
a temperature sensor positioned in the display module and configured to detect a temperature of at least a portion of the display module; and
an electronic control device communicatively coupled to the temperature sensor through the data bus and operably coupled to the display module, wherein the electronic control device is configured to adjust a brightness of the display module responsive to the detected temperature to reduce heat within the display module when the detected temperature exceeds a predetermined value;
wherein the temperature sensor is positioned in an area of the display module susceptible to overheating as determined from a thermal profile of the display module.

3. A method comprising:
sensing a temperature of at least a portion of a computer display module using a temperature sensor disposed in the computer display module;
communicating the sensed temperature to a temperature control apparatus;
adjusting a brightness of the computer display module based on the sensed temperature to adjust an amount of heat produced by the computer display module; and
selectively enabling and disabling heat producing components within the computer display module responsive to the detected temperature.

4. A method comprising:
sensing a temperature of at least a portion of a computer display module using a temperature sensor disposed in the computer display module;
communicating the sensed temperature to a temperature control apparatus; and
adjusting a brightness of the computer display module based on the sensed temperature to adjust an amount of heat produced by the computer display module;
wherein the temperature sensor is positioned in an area of the display susceptible to overheating as determined from a thermal profile of the display.

5. One or more tangible, computer-readable storage media having application instructions encoded thereon, the application instructions comprising instructions for:
determining whether a temperature sensed by a temperature sensor disposed in a computer display module exceeds a predetermined temperature range; and
adjusting a brightness of the computer display module based on the sensed temperature when the sensed temperature exceeds the predetermined temperature range to adjust an amount of heat produced by the computer display module;
wherein the application instructions comprise instructions for selectively enabling and disabling heat producing components within the computer display module based on the sensed temperature.

6. A tablet type computer, comprising:
a unitary housing;
a display;
a temperature sensor positioned in the display and configured to detect the temperature of at least a portion of the display; and
a temperature control apparatus communicatively coupled to the temperature sensor through a data bus and operably coupled to the display, wherein the temperature control apparatus is configured to adjust operation of a circuitry component in response to the detected temperature to maintain the display within a predetermined temperature range;
wherein the unitary housing contains a central processing unit, the display, the temperature sensor, and the temperature control apparatus; and
wherein the temperature control apparatus is configured to maintain the display within a predetermined temperature range by disabling one or more heat producing components within the display module in response to the detected temperature.

7. A tablet type computer, comprising:
a unitary housing;
a display;
a temperature sensor positioned in the display and configured to detect the temperature of at least a portion of the display; and
a temperature control apparatus communicatively coupled to the temperature sensor through a data bus and operably coupled to the display, wherein the temperature control apparatus is configured to adjust operation of a circuitry component in response to the detected temperature to maintain the display within a predetermined temperature range;
wherein the unitary housing contains a central processing unit, the display, the temperature sensor, and the temperature control apparatus; and
wherein the temperature sensor is positioned in an area of the display susceptible to overheating as determined from a thermal profile of the display.

* * * * *